Nov. 3, 1953  J. D. RUST  2,657,514
COTTON PICKER WITH FLUFFER
Filed April 4, 1951  3 Sheets-Sheet 1

INVENTOR.
JOHN D. RUST
BY
Estabrook and Estabrook
ATTORNEYS

Nov. 3, 1953  J. D. RUST  2,657,514
COTTON PICKER WITH FLUFFER
Filed April 4, 1951  3 Sheets-Sheet 2
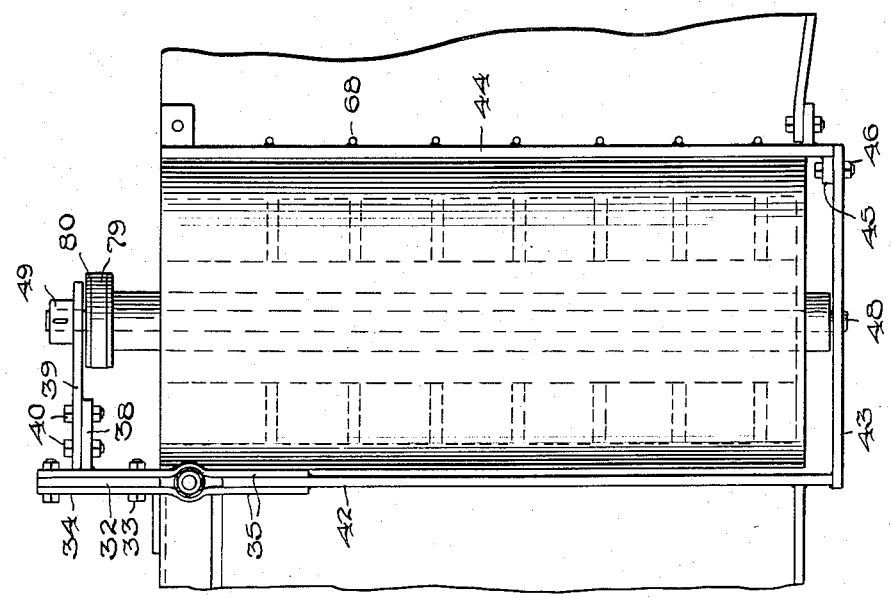
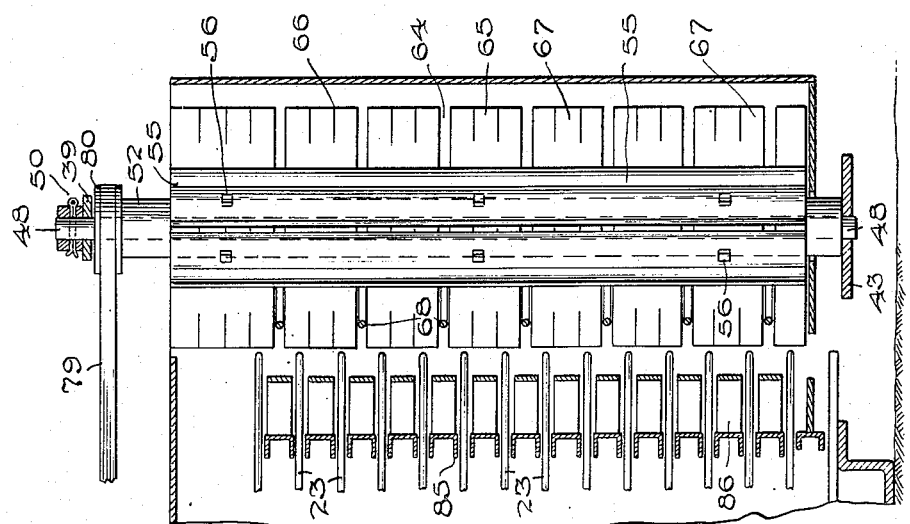
INVENTOR.
JOHN D. RUST
BY
Estabrook & Estabrook
ATTORNEYS

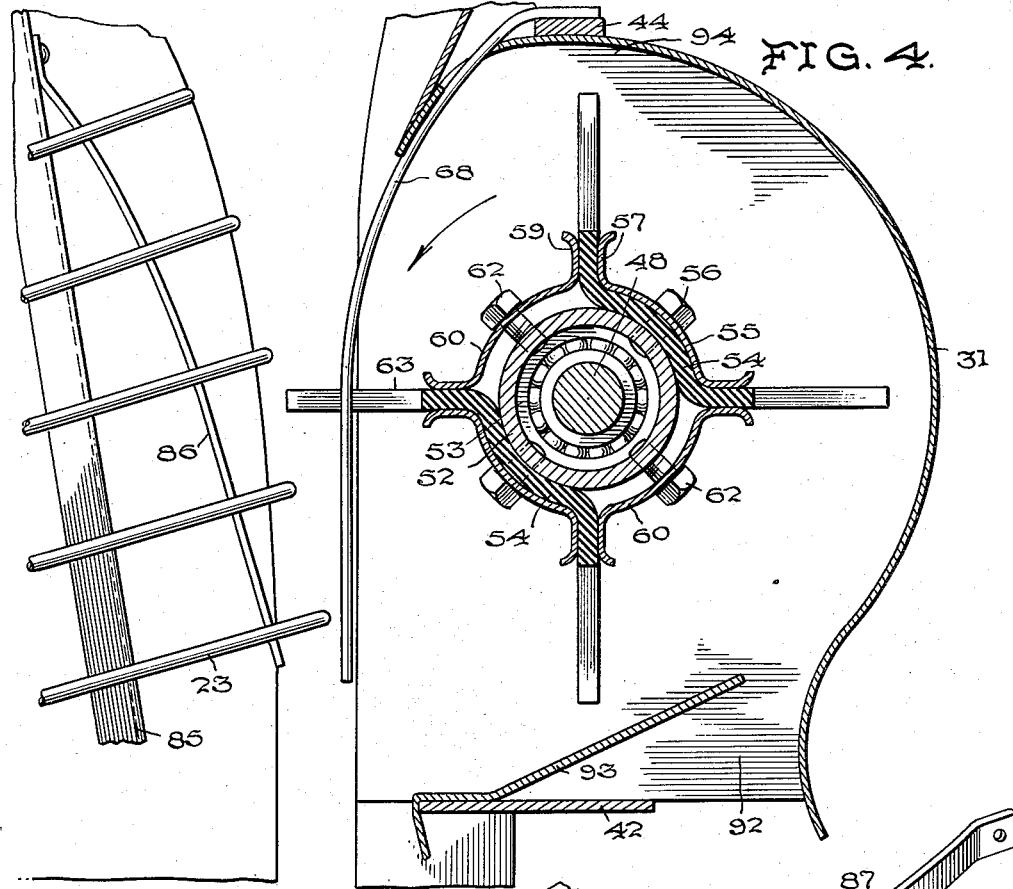
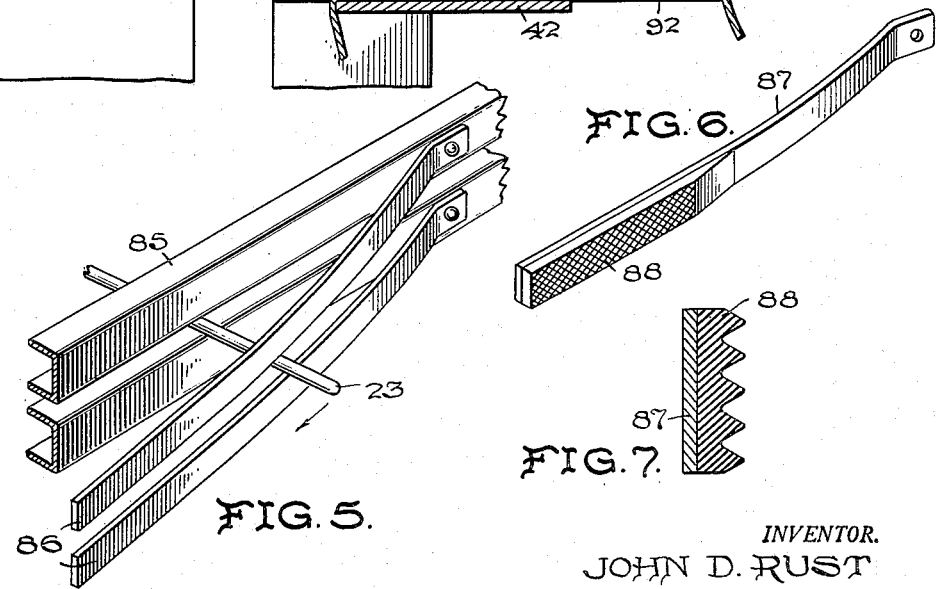

Patented Nov. 3, 1953

2,657,514

UNITED STATES PATENT OFFICE 2,657,514

COTTON PICKER WITH FLUFFER

John D. Rust, Pine Bluff, Ark.

Application April 4, 1951, Serial No. 219,145

20 Claims. (Cl. 56—42)

The present invention relates broadly to cotton picking machines and more specifically to an improvement for cotton picking units for fluffing the lint of open cotton bolls.

It has been found from experience that healthy and matured cotton can be picked very effectively and efficiently by spindle type machines, such as a Rust cotton picking machine, when the lint of the open cotton boll is in a fluffy state or condition. Under such conditions the moistened wire spindles of a cotton picking machine readily engage the lint of the open cotton boll and wind the cotton upon the spindles, thus thoroughly picking the open cotton from the stalk.

Such a condition, however, does not always exist in an entire field of open cotton, due to boll weevil infestation, "honeydew," or other adverse conditions. Under such circumstances a large percentage of the open cotton is not fluffy and, consequently, it does not readily wind onto the spindles. The present invention is designed to overcome such conditions by fluffing the lint of open cotton bolls.

The rotary fluffing device of the present invention is driven at a relatively high rate of speed so that the flexible members or flaps of the fluffing device engage the cotton bolls with such rapidity that the open cotton bolls are virtually exploded into a white fluffy mass. In such a condition the cotton fibres are readily engaged by the moist rotating spindles and wound thereupon, thus enabling the use of a much shorter spindle slat belt with a fewer number of picking spindles than was possible with machines of previous design. Thus the present invention permits the picking of cotton in a much more efficient manner with a smaller and more compact and economical picking unit. The device of the present invention is readily adaptable for use in cotton fields wherein the cotton stalks or plants have both green and open cotton bolls. The fluffing device of the present invention is so designed that it will not damage the green bolls on the plants. The fluffing device of the present invention is so designed that it may be included in a picking unit as an integral part thereof at the time of constructing said picking unit, or it is readily adaptable for use as an attachment for picking units that have already been constructed, in that the fluffing device is so designed that it may be detachably mounted on a picking unit thereby permitting the fluffing device to be readily removed from said unit when its use is not required.

One of the objects of the present invention is to provide a cotton picking unit having a rotatable impeller or member for fluffing the lint of open cotton balls.

A further object is to provide a cotton picking unit having an impeller formed with resilient or flexible blades or flaps which effectively engage open cotton bolls for fluffing the cotton.

A still further object is to provide a cotton picking unit, having a cotton fluffing impeller with flexible blades or flaps which are adapted to yield to permit the passage of green bolls without damaging said bolls.

Other objects of the present invention are to provide a cotton picking unit having an impeller which is simple in design, economical of manufacture, and capable of conditioning cotton for effective picking as it enters the plant passageway of the picking unit of the cotton picking machine.

Other objects and advantages more or less ancillary to the foregoing and the manner in which all of the various objects are realized will appear in the following description which, considered in connection with the accompanying drawings, sets forth the preferred embodiment of the invention.

Referring to the drawings wherein the preferred embodiment of the invention is illustrated:

Figure 2 is a vertical sectional view on an enlarged scale showing the cotton fluffing device and its relation with the picking spindles, the view being taken on line 2—2 of Figure 1;

Figure 3 is a side elevational view of the cotton fluffing device showing the mounting structure therefor;

Figure 4 is an enlarged top plan view of the cotton fluffing device and the cotton plant guide members with the driving mechanism and a portion of the housing removed;

Figure 5 is a detail view on an enlarged scale showing the guide fingers for directing the stalks of cotton toward the fluffing device;

Figure 6 is a detail view on an enlarged scale of a modification of the guide fingers shown in Figure 5, and Figure 7 is an end view on an enlarged scale of the guide finger shown in Figure 6.

Figure 1:
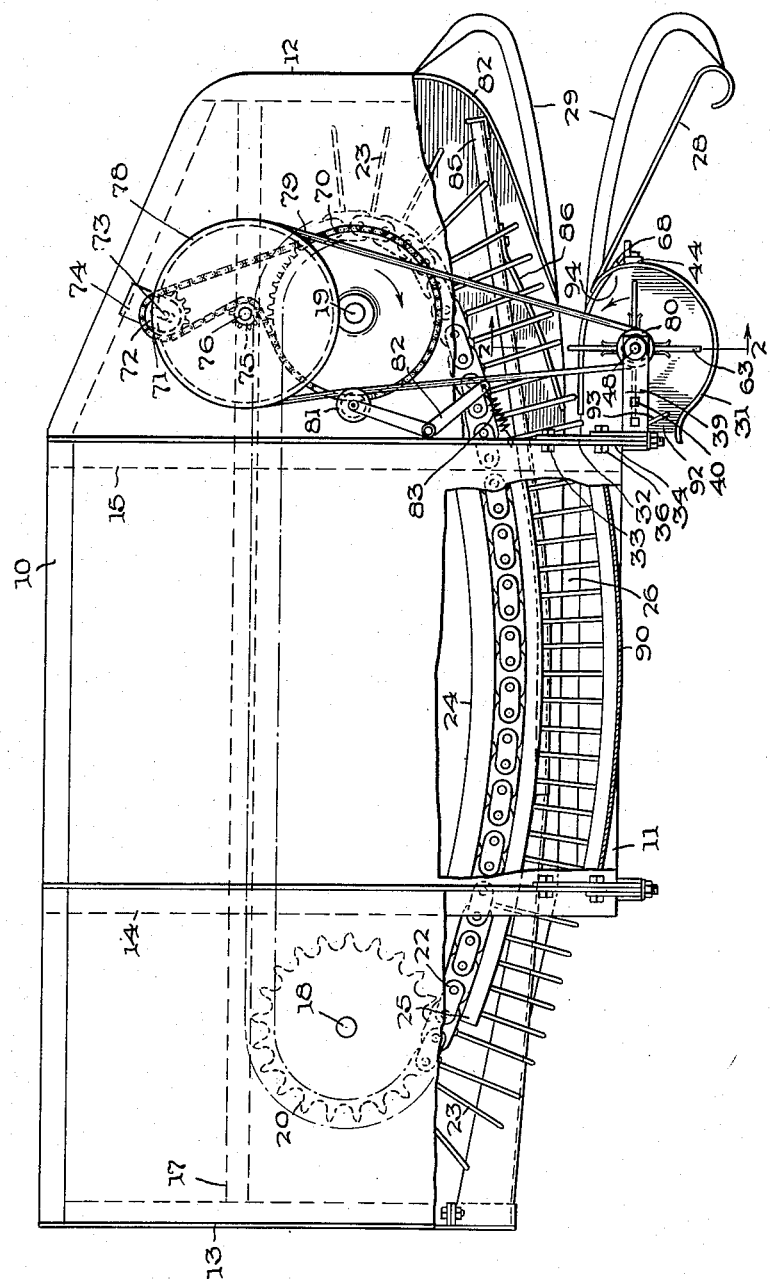
Figure 1 is a top plan view of a cotton picking unit showing the drive mechanism for the rotary fluffing device of the present invention with a portion of the housing cover removed.

Referring to the drawings there is shown in Figure 1 a Rust cotton picking unit having side frame members 10 and 11, and end frame members 12 and 13. The side frame members 10 and 11 have transverse frame bracing members 14 and 15 secured thereto. A longitudinal extending frame bracing member 17 is secured to the end frame members 12 and 13 and the transverse frame members 14 and 15 to provide a rigid frame structure for the picking unit. The complete cotton picking machine including the picking unit carrying structure is not illustrated as it is not, per se, a part of the present invention, however, the unit may be carried in any suitable manner by means of various structures such as are shown in Rust Patents 2,085,046, 2,175,216, 2,502,063, and others.

A drive shaft 18 and a driven shaft 19 are mounted in suitable bearing supports, not shown, on the frame structure of the picking unit. The shafts 18 and 19 have suitable sprockets mounted thereon but only the top drive sprocket 20 on the shaft 18 is indicated in dotted lines in Figure 1. The sprockets on shafts 18 and 19 have chains 22 entrained there about for carrying spindle slats, not shown, which in turn have spindles 23 journalled therein. It is to be understood that the shafts 18 and 19 are provided with sprockets adjacent their top and bottom ends and each of the sprockets mounted on the respective shafts have chains entrained thereabout and the spindle slats may be connected to and extend between the top and bottom chains in a manner similar to that shown in Rust Patent 2,085,046, of June 29, 1937. The transverse frame members 14 and 15 have secured thereto adjacent one side of the picking unit guide rails 24 and 25 which are conventionally employed for guiding and supporting the top chain of the spindle conveyor.

A picking tunnel or plant passageway 26 extends from the forward end of the cotton picking unit to the transverse frame member 14 so that the spindles 23 which project into the passageway 26 are capable of engaging the open cotton bolls as the plants pass through the passageway during the travel of the cotton picking machine along a row of plants. The forward end portion of the plant passageway 26 is defined by curved elements 28, which together with boll lifting elements 29 engage and direct the cotton plants into the picking mechanism as the cotton picking machine moves along a row of plants. All of the foregoing parts and elements are conventional in a Rust cotton picking unit and, per se, do not constitute a part of the present invention, thus a more detailed description of said parts or elements is not deemed necessary.

The present invention is directed to a rotary impeller located in the forward portion of the plant passageway 26 and arranged to engage the open cotton bolls for fluffing the cotton as the plants pass through the passageway. As shown in Figures 1 and 4, a housing 31 for the impeller is positioned intermediate the transverse frame member 15 and one of the guide elements 28. The transverse frame member 15 has a vertically extending plate 32 secured thereto at one end by suitable bolts 33. A pair of arms 34 are secured to opposite sides of the plate 32 and project outwardly beyond the side frame member 11 with the ends of said arms terminating in downwardly extending portions 35. The arms 34 are secured to the plate 32 by a nut and bolt 36 for pivotal movement with respect thereto. A spring, not shown, is connected to the depending portions 35 and the frame member 11 to permit a slight yielding movement of said depending portions 35 of the arms 34. One of the depending portions 35 of the arms 34 has a bracket 38, Figure 3, secured thereto and a plate member 39 is secured to said bracket 38 by nuts and bolts 40. The depending portions 35 of the arms 34 have a bar 42 disposed therebetween and secured thereto. The bar 42 extends down and along one side of the cotton picking unit and terminates in a plate member 34, which is affixed to said bar. The plate 43 extends across the bottom of the impeller housing 31 and has secured at its forward end a vertically extending post 44. The lower end of the post 44 is provided with a lug 45 for securing said post to the plate member 43 by nut and bolt 46. The upper end of the post 44 is provided with a lug 47 for anchoring said post to the top of the forward portion of the picking unit frame, not shown.

As shown in Figures 2 and 3, the plate members 39 and 43 are adapted to support a shaft 48, which shaft projects through suitable apertures provided in said plate members. The upper end of the shaft 48 extends through a cap nut 49 which is affixed to the top surface of the plate member 39, and a cotter pin 50 extends through said cap nut 49 and shaft 48 for securing said shaft against rotation. A rotatable sleeve or member 52 is mounted for rotation on the shaft 48 intermediate the plate members 39 and 43. Suitable bearings 53, Figure 4, are interposed between the rotary member 52 and shaft 48 so that the rotary member will have a free rotative movement with respect to the shaft 48.

The rotatable member 52, Figures 2 and 4, has mounted thereon throughout the greater portion of its length sheets or strips of resilient or flexible material 54. The middle or central portion of the flexible sheets 54 are secured to the rotatable member 52 by plates or clamps 55 and cap screws 56, the latter extending through the plates 55, resilient sheets 54 and being threaded into the wall of the rotatable member 52. The plates 55 are formed with outwardly flared end portions 57 which are spaced from complementary flared end portions 59 formed on plates or clamps 60 which are interposed between the clamps 55. The clamps 60 are secured to the rotatable member 52 by screws 62 and together with the clamps 55 completely surround and enclose the rotatable member 52. The free ends of the flexible sheets 54 extend between the flared ends 57 and 59 of the clamps 55 and 60, respectively, and define impeller blades or flaps 63. The impeller flaps 63 are provided throughout their length with slots 64 which extend from the flared ends 57 and 59 of the clamps 55 and 60 to the outer edges of said flaps so as to provide a plurality of segments 65. Each of the segments 65 of the impeller flaps 63 is provided with slits 66 extending inwardly a short distance from the outer edges of each segment 65 so that said segments are formed with a plurality of fingers 67, which fingers are adapted to engage the open cotton bolls as the plants pass through the plant passageway 26.

The post 44 is provided throughout its length with spaced rods 68, which rods have an end thereof secured to said post. The rods 68 throughout a portion of their length are of an arcuate configuration and are arranged to extend around the rotatable member 52, but spaced therefrom, with the free ends of the rods being straight and projecting along one side of the plant passageway 26 and terminate at the front of the picking section of said passageway. The rods 68 are so spaced on the post 44 as to permit the rods to extend through the slots 64 provided in the impeller flaps 63 so that as the impeller flaps 63 are rotated within the housing 31 the segments 65 of the impeller flaps 63 will pass between the rods 68. While the impeller flaps 63, as shown herein, are formed from a sheet of flexible material and are provided with slots in the edges thereof to define segments, which segments have slits formed therein to define a plurality of fingers in each segment, it is readily apparent that instead of a single sheet of flexible material that the impeller flaps may be formed from a plurality of separate and independent strips or members of flexible material which could be anchored between the flared end portions 57 and 59 of the clamps 55 and 60.

The driven shaft 19 has a sprocket 70, Figure 1, secured to the top end portion thereof with a sprocket chain 71 entrained thereabout. The chain 71 passes around an idler sprocket 72 that is rotatably mounted on a shaft 73, supported on a bracket 74 which is secured to the side frame member 10. The chain 71 also passes around a sprocket 75 which is rotatably mounted on a shaft 76 that is secured on the longitudinal frame member 17. There is also rotatably mounted on the shaft 76, a pulley 78 which has its hub rigidly secured to the hub of the sprocket 75 so that the sprocket 75 and pulley 78 rotate as a unit. A belt 79, preferably of the V type, is entrained about the pulley 78 and also around a pulley 80 which is secured to the sleeve 52 of the impeller. An idler pulley 81 is rotatably mounted on an end of a bell crank lever 82, which is pivotally mounted on the transverse frame member 15. The pulley 81 is adapted to engage the belt 79 for retaining said belt under tension. A tensioning spring 83 is secured to the other end of the bell crank lever 82 and to the transverse frame member 15 for constantly urging the pulley 81 into engagement with the belt 79. Thus, upon the rotation of shaft 19 and sprocket 70, in the direction of the arrow shown in Figure 1, the sprocket chain 71 passing around idler sprocket 72 will drive sprocket 75 and pulley 78. The rotation of shaft 19 is counter to the direction of rotation of sprocket 75 and pulley 78. Therefore, the belt 79 will rotate the pulley 80 and the rotatable member 52 in the same direction as the pulley 78. Thus, the movement of the impeller and the spindles are in proper relation with respect to each other for the purpose desired.

The front and the rear end frame members 12 and 13 have secured thereto in vertically spaced relation a plurality of stalk guards 85 which extend along the inner side of the plant passageway 26. The forward end portions of the stalk guards 85 have secured thereto guide fingers or members 86 which are arranged to project into the entrance portion of the plant passageway opposite the impeller structure. The guide fingers 86 are adapted to cooperate with the guide rods 68 to define a narrow path for guiding the cotton plants and cotton bolls into the path of rotation of the flexible segments 65 of the impeller blades or flaps 63. There is shown in Figures 6 and 7 an alternative guide finger 87 which may be substituted for the guide fingers 86. The guide fingers 87 have secured to the free ends thereof serrated rubber members 88 which serve to engage and fluff any open bolls of cotton which might be missed by the rotating impeller flaps 63 due to the position of said bolls on the cotton plant. The serrated rubber members 88 are capable of engaging and fluffing the open cotton yet they are sufficiently resilient to permit the machine to pass over the row of cotton plants without injuring said plants.

The transverse frame members 14 and 15, Figure 1, have secured thereto along the outer side of the plant passageway 26 a stalk crowder 90, which crowder, in conjunction with the guards 85, define the picking section of the plant passageway 26. The rear end portion of the impeller housing 31 is spaced from the forward end of the stalk crowder 90 to provide an air current passage 92 so that upon rotation of the impeller air will be drawn into the housing. There is secured to the forward end of the stalk crowder 90 a baffle plate 93, Figure 4, which is spaced from the inner surface of the impeller housing 31 and arranged to project over a portion of the opening 92 so that any cotton which might be drawn into the impeller housing, due to the action of the impeller flaps, will be directed past the opening 92 and carried around the inner surface of the impeller housing 31. The forward portion of the impeller housing 31, adjacent the post 44 is provided with a slightly bulged portion or area 94 so that any cotton drawn into the impeller housing will be directed from the bulged portion 94 of the housing in a rearward direction and into the throat section of the plant passageway 26.

In the operation of the present invention the impeller is rotated simultaneously with the rotation of the cotton picking mechanism. Thus, as the cotton picking unit is moved along a row of cotton plants the plants are directed into the plant passageway 26 by members 28 and 29. As the cotton plants enter the plant passageway the guide fingers 86 and guide rods 68 engage the plants and guide them into the path of rotation of the impeller flaps 63, which flaps strike the open cotton bolls and thus fluff the lint so that it is in the best condition for being engaged and wrapped around the rotating spindles 23. Prior to the engagement of the cotton plants by the guide fingers 86 and guide rods 68 the outer end portions of the picking spindles 23 and the outer edge of the impeller flaps engage the cotton plants and tend to maintain the plants in a desirable picking position. The outer end portions of the picking spindles 23 and the impeller flaps urge the cotton plants past the narrow throat of the plant passageway defined by the guide fingers 86 and guide rods 68. Thus, the picking efficiency of the cotton picking machine is considerably increased.

In the event that some of the cotton plants still have green bolls thereon the flexible flaps of the impeller blades 63 will not damage the green bolls or break them from the plant. Due to the direction of rotation of the impeller blades or flaps 63 and the direction of the resultant air stream any cotton that might be dislodged from the cotton boll will be directed into the plant passageway 26 where it will engage the picking spindles 23.

While I have shown this cotton fluffing and cleaning device in connection with a picking unit of the Rust cotton picking machine, it is not the intention that the present device be limited to the Rust machine as it may be readily adapted to any spindle type cotton picking machine.

From the foregoing description, taken in connection with the accompanying drawings, it is thought that the construction, operation and advantages of the invention will be clear to those skilled in the art to which it relates.

I claim:

1. A cotton picking unit including a plant passageway for the passage of cotton plants, picking spindles mounted on an endless conveyor for engaging the cotton plants in said passageway, means carried by said unit for driving said conveyor, in combination with a rotatable fluffing device adapted for use in said unit and arranged to be detachably mounted in said unit near the entrance of said passageway, said device including a rotatable member, a plurality of flexible members secured to said rotatable member and constituting flaps, said flaps being adapted to project into said passageway for engaging the cotton plants to fluff the cotton simultaneously with the engagement of the cotton by said spindles and driving mechanism connecting said rotatable member with said driving means.

2. A cotton picking unit including a plant passageway for the passage of cotton plants, said passageway having a picking section, picking spindles mounted on an endless conveyor and adapted to project into said passageway for engaging the cotton plants therein, means carried by said unit for driving said conveyor, in combination with a rotatable fluffing device adapted for use in said unit and arranged to be detachably mounted in said unit adjacent the entrance of and at one side of said passageway, said device including a rotatable sleeve, a plurality of flaps secured to said sleeve and arranged to project outwardly therefrom, said flaps in their path of rotation extending into said passageway, a plurality of spaced guide members secured to said unit adjacent the entrance of said passageway, serrated rubber members secured to said guide members and arranged to project into said passageway opposite said rotatable sleeve for directing the cotton plants into the path of rotation of said flaps, said serrated rubber members and flaps engaging the cotton plants from opposite sides for fluffing the cotton prior to the entrance of the cotton plants into said picking section and driving mechanism connecting said rotatable sleeve with said driving means for rotating said sleeve simultaneously with the movement of said endless conveyor.

3. A cotton picking unit including a plant passageway for the passage of cotton plants, said passageway having a picking section, picking spindles mounted on an endless conveyor and adapted to project into said passageway for engaging the cotton plants therein, means carried by said unit for driving said conveyor, in combination with a rotatable fluffing device adapted for use in said unit and arranged to be detachably mounted in said unit adjacent the entrance of and at one side of said passageway, said device including a rotatable member, a plurality of vertically spaced flexible strips secured to said rotatable member and arranged to project outwardly from said rotatable member and constituting flaps, said flaps in their path of rotation extending into said passageway, a plurality of spaced guide means secured to said unit on opposite sides of and adjacent the entrance of said passageway, said guide means defining a narrow path through said passageway for guiding the cotton plants into the path of rotation of said flaps for fluffing the cotton prior to the entrance of the cotton plants into said picking secion.

4. A cotton picking unit including a plant passageway for the passage of cotton plants, picking spindles mounted on an endless conveyor for engaging the cotton plants in said passageway, means carried by said unit for driving said conveyor, a stalk crowder carried by said unit and defining the outer wall of the picking section of said passageway in combination with a rotatable member carried by the forward end of said stalk crowder, a plurality of flexible strips secured to said rotatable member and constituting flaps, said flaps being adapted to project into said passageway for engaging the cotton plants to fluff the cotton contemporaneous with the engagement of the cotton by said spindles, and driving mechanism connecting said rotatable member with said driving means.

5. A cotton picking unit including a plant passageway for the passage of cotton plants, picking spindles mounted on an endless conveyor for engaging the cotton plants in said passageway, means carried by said unit for driving said conveyor, in combination with a vertically extending shaft mounted in said unit adjacent the entrance of said passageway, bearings mounted on said shaft adjacent its respective ends, a sleeve mounted on said bearings for rotative movement independently of said shaft, a plurality of clamps secured to said sleeve, flexible strips positioned between adjacent clamps and arranged to project outwardly from said sleeve and constituting flaps, said flaps in their path of rotation extending into said passageway and engaging the cotton plants to fluff the cotton contemporaneous with the engagement of the cotton by said spindles and driving mechanism connecting said sleeve with said driving means.

6. A cotton picking unit including a plant passageway for the passage of cotton plants, said passageway having a picking section, picking spindles mounted on an endless conveyor and adapted to project into said passageway for engaging the cotton plants therein, means carried by said unit for driving said conveyor, in combination with a rotatable member mounted in said unit at one side of and adjacent the entrance of said passageway, a plurality of vertically spaced flexible strips secured to said rotatable member and arranged to project outwardly from said rotatable member to define flaps, said flaps in their path of rotation extending into said passageway, a plurality of guide rods having an end thereof secured to said unit adjacent said rotatable member, said guide rods extending around a portion of said rotatable member in spaced relation therewith with the free ends of said guide rods projecting into and along one side of said passageway, said guide rods being arranged in vertically spaced relation for the passage of said flaps in their path of rotation, said guide rods guiding the cotton plants into the path of rotation of said flaps for fluffing the cotton prior to the entrance of the cotton plants into said picking section.

7. A cotton picking unit including a plant passageway for the passage of cotton plants, said passageway having a picking section, picking spindles mounted on an endless conveyor and adapted to project into said passageway for engaging the cotton plants therein, means carried by said unit for driving said conveyor, in combination with a rotatable member mounted in said unit at one side of and adjacent the entrance of said passageway, a plurality of vertically spaced flexible strips secured to said rotatable member and arranged to project outwardly from said rotatable member and constituting flaps, said flaps in their path of rotation extending into said passageway, a plurality of guide rods having an end thereof secured to said unit adjacent said rotatable member, said guide rods extending around a portion of said rotatable member in spaced relation therewith with the free ends of said guide rods projecting into and along one side of said passageway, said guide rods being arranged in vertically spaced relation for the passage of said flaps in their path of rotation, a plurality of vertically spaced guide fingers having an end thereof secured to said unit adjacent the entrance of said passageway and opposite from said rotatable member, serrated rubber members secured to the free ends of said guide fingers and arranged to project into said passageway, said guide rods and guide fingers defining a narrow path through said passageway for guiding the cotton plants, said flaps and serrated members engaging the cotton plants from opposite sides for fluffing the cotton as the cotton plants pass through said narrow path and prior to the entrance of the cotton plants into said picking section and driving mechanism connecting said rotatable member with said driving means for rotating said flaps simultaneously with the movement of said endless conveyor.

8. A cotton picking unit including a plant passageway for the passage of cotton plants, rotatable picking spindles mounted in said unit for engaging the cotton plants in said passageway, means carried by said unit for driving said spindles, in combination with a rotatable fluffing device adapted for use in said unit and arranged to be detachably mounted in said unit near the entrance of said passageway, said device including a rotatable member, a plurality of flexible members secured to said rotatable member and constituting flaps, a housing for said rotatable member carried by said unit, said flaps in their path of rotation extending into said passageway for engaging the cotton plants to fluff the cotton simultaneously with the engagement of the cotton by said spindles and driving mechanism connecting said rotatable member with said driving means.

9. A cotton picking unit including a plant passageway for the passage of cotton plants, said passageway having a picking section, rotatable picking spindles mounted in said unit and adapted to project into said passageway for engaging the cotton plants therein, means carried by said unit for driving said spindles, in combination with a rotatable fluffing device adapted for use in said unit and arranged to be detachably mounted in said unit at one side of and near the entrance of said passageway, said device including a rotatable member, a plurality of spaced flexible members secured to said rotatable member and arranged to project outwardly from said rotatable member and constituting flaps, said flaps in their path of rotation extending into said passageway, a housing for said rotatable member, a plurality of guide rods secured to said unit adjacent said rotatable member and arranged to project into said passageway toward the picking section thereof, said guide rods being arranged in spaced relation with one another for the passage of said flaps in their path of rotation, said guide rods guiding the cotton plants into the path of rotation of said flaps for fluffing the cotton prior to the entrance of the cotton plants into said picking section.

10. A cotton fluffing device for use with a cotton picking unit having a plurality of rotatably driven cotton picking spindles, said device including a housing having an open side, a rotatable member within said housing, a plurality of flexible flaps secured to and projecting from said rotatable member, said flaps in their path of rotation projecting through the open side of said housing for engaging the cotton plants to fluff the cotton, a plurality of spaced guides carried by said housing and extending across the open side of said housing and between said flexible flaps for directing the cotton plants across the open side of said housing.

11. A cotton fluffing device for use with a cotton picking unit having a plurality of rotatably driven cotton picking spindles, said device including a housing having a peripheral opening therein, a shaft in said housing, bearing supports secured to said shaft adjacent its respective ends, a member mounted on said bearing supports for rotative movement independent of said shaft, a plurality of flexible flaps secured to and projecting from said member, said flaps in their path of rotation projecting through the peripheral opening of said housing for engaging the cotton plants to fluff the cotton, and a plurality of spaced guides carried by said housing and extending across the peripheral opening thereof and between said flexible flaps for directing the cotton plants across the peripheral opening of said housing.

12. A cotton fluffing device for use with a cotton picking unit including a plant passageway and rotatably driven spindles adapted to engage cotton plants in said passageway, said fluffing device adapted for detachably mounting in said picking unit near the entrance of said passageway and including a rotatable member, a plurality of flexible members secured to and projecting from said rotatable member, said flexible members constituting flaps and spaced guides extending at least partially across a side of said rotatable member and in a lengthwise direction of said passageway, said flaps in their path of rotation extending into said passageway for engaging the cotton plants to fluff the cotton simultaneously with the engagement of the cotton by the spindles.

13. A cotton fluffing device as set forth in claim 12 and including an arcuate housing adapted to be mounted on said unit in concentric relation with said rotatable member and positioned in close proximity to the ends of said flaps.

14. A cotton fluffing device as set forth in claim 12 including guide members adapted for detachably mounting on said picking unit adjacent the entrance of said passageway and opposite from said rotatable member, said guide members and guides defining a narrow path through said passageway for guiding the cotton plants into proximity with the orbit of said flaps.

15. A cotton fluffing attachment for use with a cotton picking unit including a plant passageway having an inner and an outer wall and rotatably driven spindles adapted to engage cotton plants in said passageway, said attachment comprising a housing having a peripheral opening therein, an elongated rotatable member in said housing, a plurality of flexible flaps secured to and projecting from said rotatable member over approximately its full length, said flaps in their path of rotation projecting through the peripheral opening of said housing, means adapted to detachably mount said attachment in said outer wall, a plurality of spaced guides extending across the peripheral opening of said housing and between said flaps, means adapted to detachably mount said guides on said outer wall, a plurality of guide members, means adapted to detachably mount said guide members in spaced relation on said inner wall opposite said guides to direct the cotton plants into engagement with said flaps for fluffing the cotton.

16. A cotton picking unit including a plant passageway for the passage of cotton plants, rotatable picking spindles mounted in said unit for engaging the cotton plants in said passageway, in combination with a rotatable member mounted in said unit near the entrance of said passageway, a plurality of flaps secured to said rotatable member, a housing for said rotatable member carried by said unit, said flaps in their path of rotation extending into said passageway, a plurality of spaced guide members secured to said unit adjacent the entrance of said passageway, serrated rubber members secured to said guide members and arranged to project into said passageway opposite said rotatable member for directing cotton plants into the path of rotation of said flaps, said serrated rubber members and flaps engaging the cotton plants from opposite sides for fluffing the cotton, and means carried by said unit for driving said rotatable member.

17. A cotton fluffing device for use with a cotton picking unit having a plurality of rotatably driven cotton picking spindles, said device including a housing havng a peripheral opening therein, a rotatable member within said housing, a plurality of flaps secured to and projecting from said rotatable member, said flaps in their path of rotation projecting through the peripheral opening of said housing for engaging the cotton plants to fluff the cotton.

18. A cotton fluffing device for use with a cotton picking unit having a plant passageway for the passage of cotton plants, rotatable picking spindles mounted in said unit for engaging the cotton plants in said passageway, said device being mountable in said picking unit near the entrance of the passageway, said device including a rotatable member having a plurality of flaps secured thereto, a housing for said rotatable member carried by said unit, said flaps in their path of rotation extending into said passageway, a plurality of spaced guide members secured to said unit adjacent the entrance of said passageway, serrated rubber members secured to said guide members and arranged to project into said passageway opposite said rotatable member for directing cotton plants into the path of rotation of said flaps, said serrated rubber members and flaps engaging the cotton plants from opposite sides for fluffing the cotton, and means carried by said unit for driving said rotatable member.

19. A cotton picking unit having means defining a passageway for the passage of cotton plants with at least one portion of the means defining the passageway having an opening therein, in combination with a rotatable fluffing means adapted for use in said unit and arranged to be detachably located adjacent said passageway defining means, said fluffing means having a plurality of flexible members secured thereto and extending through said opening and guide fingers extending between said flexible members and across said opening.

20. A cotton picking unit having means defining a passageway for the passage of cotton plants with the means defining the passageway having an opening in one portion thereof and longitudinally extending openings in the other portion, picking spindles carried by the unit and extending through the longitudinal openings into the passageway, in combination with a rotatable fluffing means adapted for use in said unit and arranged to be detachably located adjacent said passageway defining means, said fluffing means having a plurality of flexible members secured thereto and extending through said opening into the passageway opposite said spindles and guide fingers extending between said flexible members and across said openings.

JOHN D. RUST.

References Cited in the file of this patent
UNITED STATES PATENTS

| Number | Name | Date |
| --- | --- | --- |
| 1,585,243 | Hanselman | May 18, 1926 |
| 2,058,514 | Rust et al. | Oct. 27, 1936 |
| 2,082,053 | Freudenberg | June 1, 1937 |